United States Patent
Anderson et al.

(10) Patent No.: US 7,294,162 B2
(45) Date of Patent: Nov. 13, 2007

(54) EXHAUST FILTER

(75) Inventors: Steve Anderson, Stevens Point, WI (US); Jared Blaisdell, Bloomington, MN (US); John Belisle, Hampton, MN (US); John Herman, Rhinelander, WI (US); John Hiemstra, Lakeville, MN (US); Gary D. Reeves, Lakeville, MN (US); Wayne M. Wagner, Apple Valley, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 428 days.

(21) Appl. No.: 10/978,686

(22) Filed: Nov. 1, 2004

(65) Prior Publication Data

US 2005/0126138 A1 Jun. 16, 2005

Related U.S. Application Data

(60) Provisional application No. 60/517,363, filed on Nov. 4, 2003.

(51) Int. Cl.
*B01D 24/00* (2006.01)

(52) U.S. Cl. .................... 55/498; 55/510; 55/522; 55/525; 55/527; 55/502; 55/524

(58) Field of Classification Search ............ 55/498, 55/502, 510, 522, 523, 524, 527
See application file for complete search history.

(56) References Cited

U.S. PATENT DOCUMENTS 3,078,650 A 2/1963 Anderson et al.
3,410,060 A * 11/1968 Reilly et al. .................. 55/376
3,499,269 A 3/1970 Bois
3,857,688 A * 12/1974 Wisnewski .................... 55/483
3,918,937 A * 11/1975 Holloway et al. ............. 95/268
3,918,943 A * 11/1975 Holloway et al. ............. 55/337
3,937,015 A * 2/1976 Akado et al. .................. 60/288
4,276,071 A 6/1981 Outland
4,478,618 A * 10/1984 Bly et al. ...................... 55/314
4,813,231 A * 3/1989 Bykowski ..................... 60/274
4,851,015 A 7/1989 Wagner et al.
4,902,487 A 2/1990 Cooper et al.
5,246,472 A 9/1993 Herman et al.
5,415,772 A * 5/1995 Garcera et al. ............. 210/232
5,468,384 A * 11/1995 Garcera et al. ............. 210/232
5,484,466 A * 1/1996 Brown et al. .................. 55/498
5,547,480 A 8/1996 Coulonvaux
5,830,250 A * 11/1998 Shirk et al. .................... 55/498
6,833,017 B2 * 12/2004 Quigley ......................... 55/497
2004/0035094 A1 * 2/2004 De Jersey

OTHER PUBLICATIONS

Empyrean Holdings/Inc., Annual Report—Small Business, Dec. 31, 2001, http://www.secinfo.com/dlZ7X7.31j.htm.*
APC/Filtration Specialties—High Temperature Filter Fabrics, http://www.hightempfelt.com/private/products_dynaglas.htm, 1 page (Copyright 2002).
Dynaglas® from Filtration Specialties, Inc. Fact Sheet, 1 page (Apr. 1, 2003).

* cited by examiner

*Primary Examiner*—Duane Smith
*Assistant Examiner*—Sonji Turner
(74) *Attorney, Agent, or Firm*—Merchant & Gould P.C.

(57) ABSTRACT

An exhaust filter having a pleated filter media mounted between end caps is disclosed herein. The filter has a construction suitable for high temperature environments such as engine exhaust systems.

22 Claims, 5 Drawing Sheets

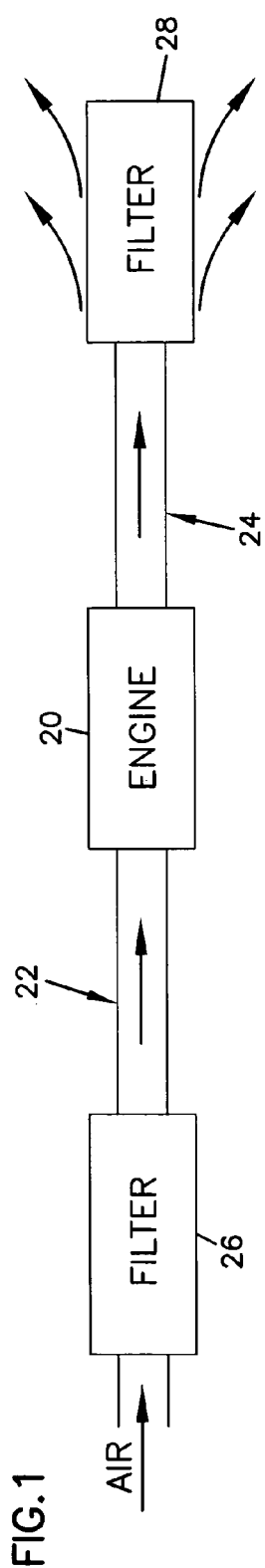
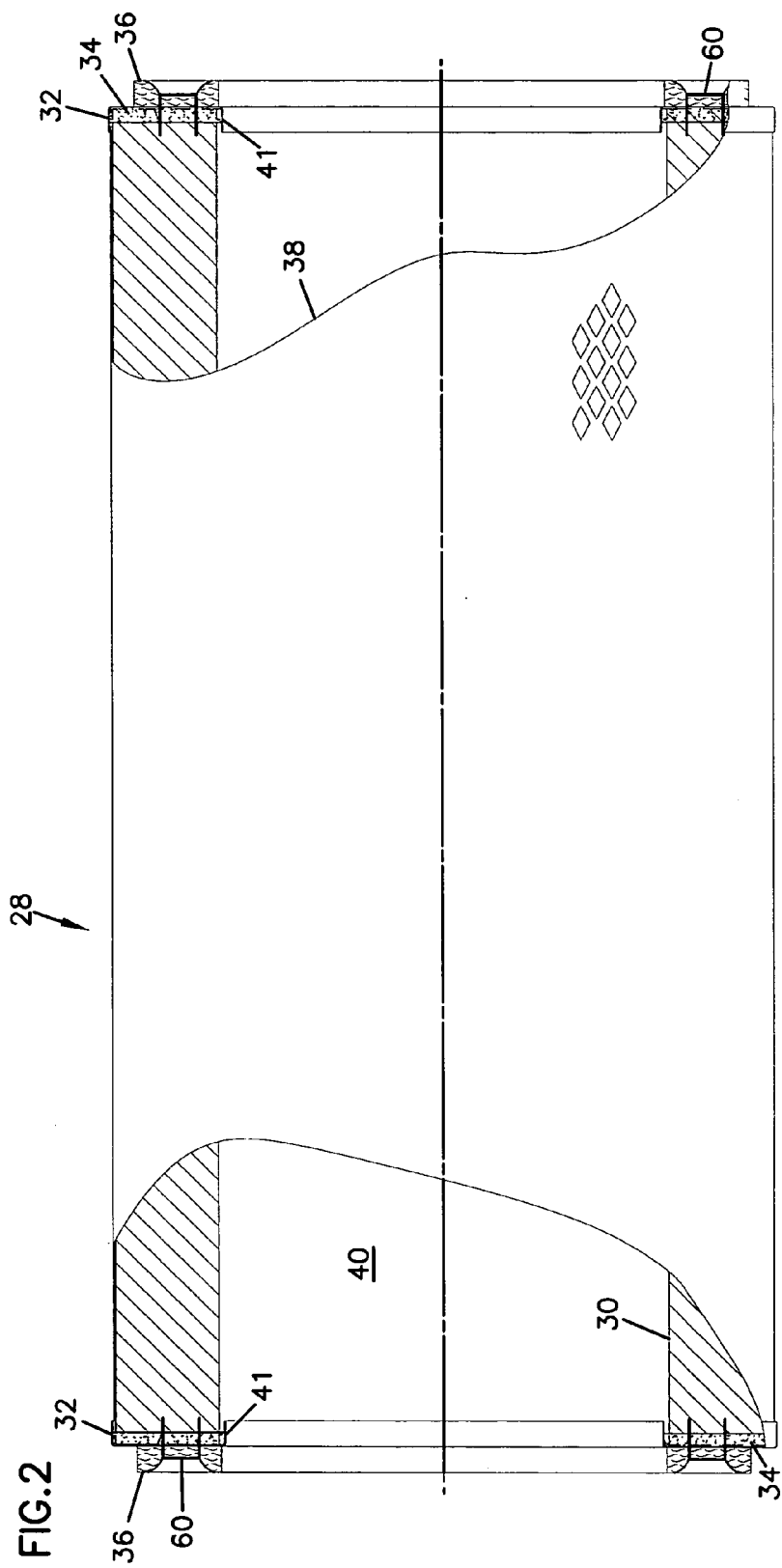
FIG.1
FIG.2

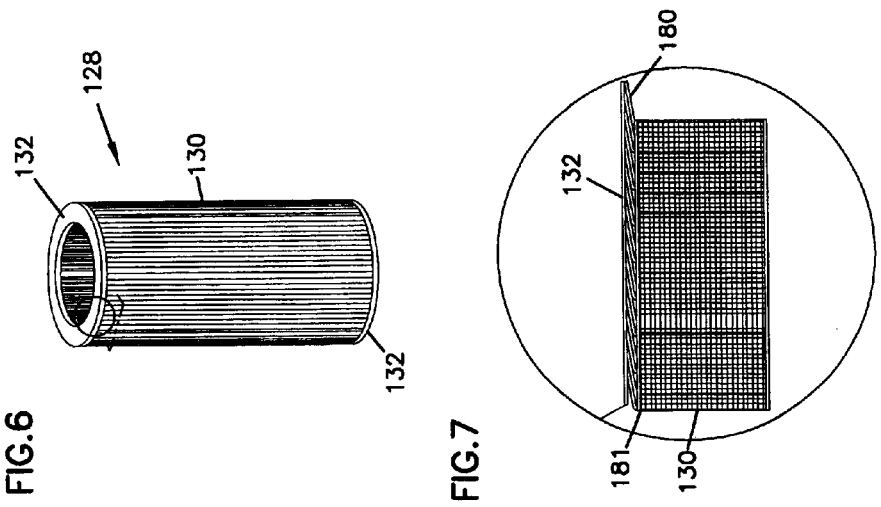
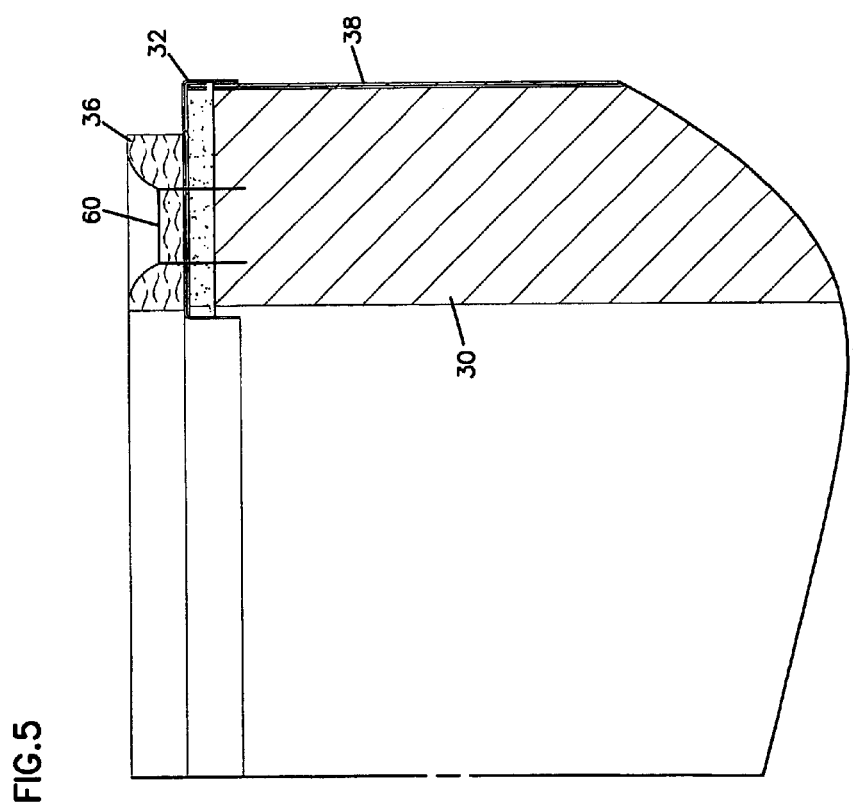

US 7,294,162 B2

EXHAUST FILTER

CROSS REFERENCE TO RELATED APPLICATION

The present application claims the benefit of U.S. Provisional Patent Application Ser. No. 60/517,363 filed Nov. 4, 2003, which application is hereby incorporated by reference in its entirety.

TECHNICAL FIELD

The present invention relates generally to air filters. More particularly, the present invention relates to air filters for use in exhaust systems.

BACKGROUND

Engine exhaust filters can have a variety of constructions. One type of exhaust filter includes a cellular ceramic core defining a honeycomb of channels having plugged ends. Filters having this construction are disclosed in U.S. Pat. Nos. 4,276,071 and 4,851,015. Other exhaust filters include a filter media defined by a plug of wire mesh. Filters having this construction are disclosed in U.S. Pat. Nos. 3,499,269 and 4,902,487. Filters of the type indicated above can be catalyzed or un-catalyzed. Un-catalyzed filters require high temperatures to be efficiently regenerated. Catalyzed filters can be regenerated at lower temperatures, but can generate undesirable by-products such as $NO_2$.

Filters are also often used to filter the intake air drawn into an engine. U.S. Pat. Nos. 3,078,650 and 5,547,480 disclose air filters of the type used with the intake systems of engines. These filters include cylindrical pleated filter elements mounted within housings. The filter elements define hollow interiors, and the air being filtered travels radially through the pleated filter elements. While suitable for engine intake applications, these types of filters are not adapted for the high temperature environment created by engine exhaust.

Engine emission regulations have become increasingly stringent. What are needed are alternative filtration systems for use in reducing engine exhaust emissions.

SUMMARY

One aspect of the present invention relates to an air filter having a design suitable for the air filter to be used in a relatively high temperature environment such as an engine exhaust system. In one embodiment, the air filter includes a cylindrical, pleated filter element.

Examples of a variety of inventive aspects in addition to those described above are set forth in the description that follows. It is to be understood that both the foregoing general description and the following detailed description are exemplary and explanatory and are not restrictive of the broad inventive aspects that underline the examples disclosed herein.

BRIEF DESCRIPTION OF THE DRAWINGS

FIG. 1 schematically shows an example system in which filters in accordance with the principles of the present disclosure may be utilized;

FIG. 2 is a cut away view of an air filter having features that are examples of inventive aspects in accordance with the principles of the present disclosure;

FIG. 5 illustrates a portion of FIG. 2 in enlarged detail;

FIG. 6 illustrates another filter element having features that are examples of inventive aspects in accordance with the principles of the present disclosure;

FIG. 7 is an enlarged detailed cross-sectional view of a portion of FIG. 6;

DETAILED DESCRIPTION

Figure 4:
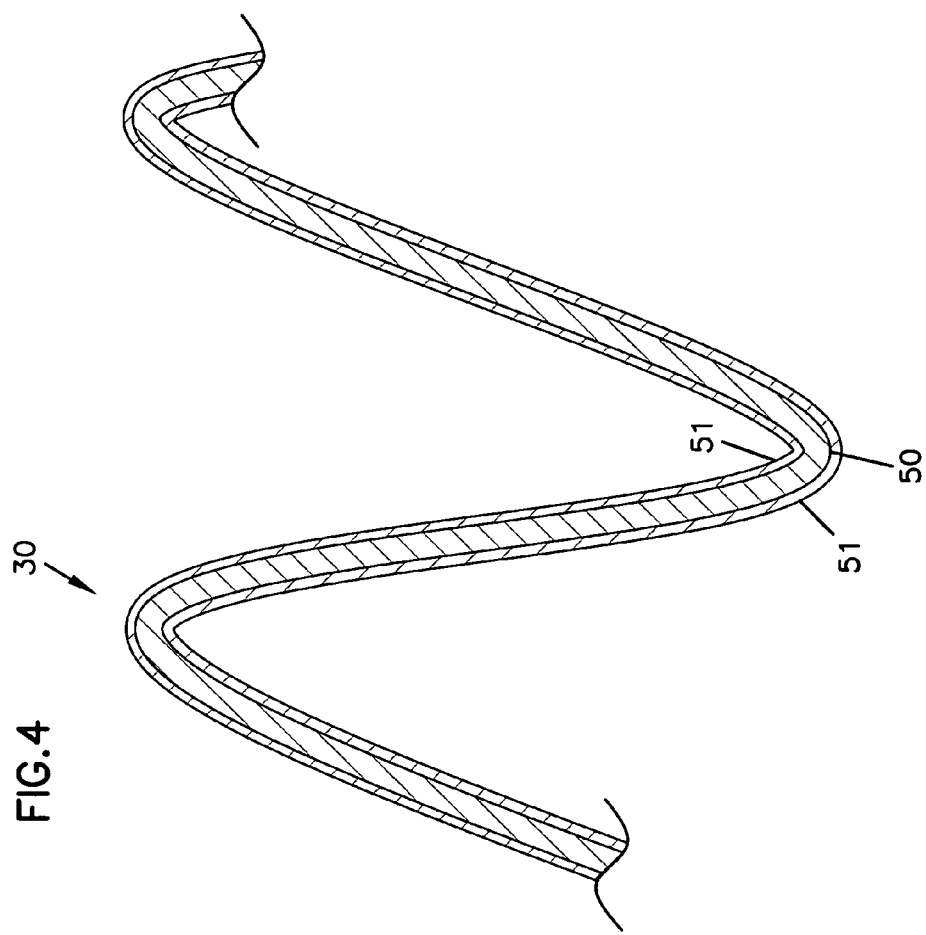
FIG. 4 is a cross sectional view through a portion of the filter media of the air filter of FIG. 2.

FIG. 1 schematically illustrates an engine 20 having an intake system 22 and an exhaust system 24. An air filter 26 can be provided as part of the intake system 22 to remove particles from the air drawn into the engine 20. An air filter 28 in accordance with the principles of the present disclosure can be provided at the exhaust system 24 for removing volatile particulates as well as non-volatile particulates such as carbon-based particulates (e.g., soot) from the exhaust stream. In certain embodiments, the engine 20 can be a diesel engine such as the type used in motor vehicles such as forklifts, skid steer loaders, mining equipment, or other motor vehicles or equipment. It will be appreciated that the exhaust stream generated by the engine 20 can often have a relatively high temperature. For example, temperatures exceeding 600° F. are not uncommon. Therefore, it is preferred for the air filter 28 to have a construction suitable for operating in a relatively high temperature environment.

A. Example Filter Assembly

Figure 3:
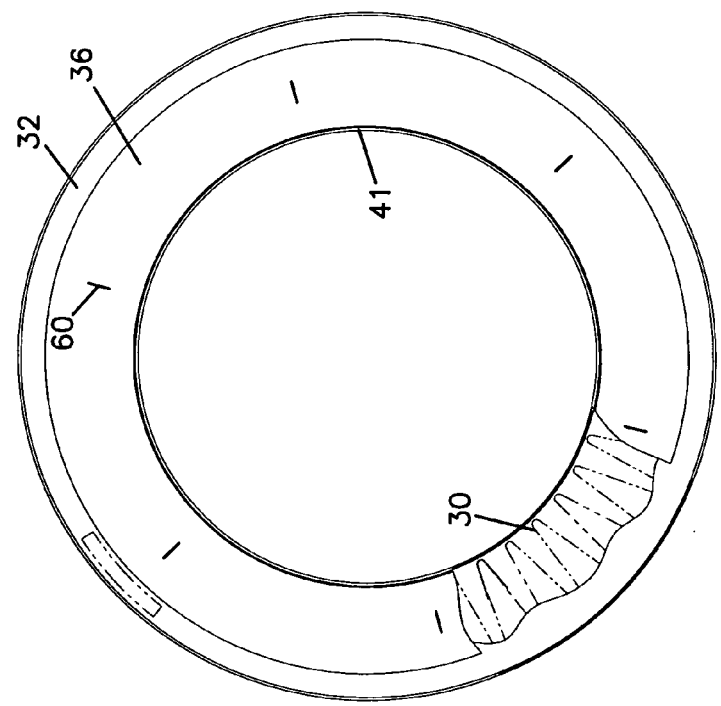
FIG. 3 is an end view of the air filter of FIG. 2.

FIGS. 2 and 3 illustrate an air filter 28 having features that are examples of inventive aspects in accordance with the principles of the present disclosure. The air filter 28 includes a generally cylindrical filter media 30 mounted between end caps 32. The ends of the filter media 30 can be sealed and secured to the end caps 32 by a potting material 34. Sealing gaskets 36 are provided on axially outwardly facing surfaces of the end caps 32. A cylindrical shell 38 preferably is mounted about the exterior of the filter media 30. The shell 38 defines openings for allowing the passage of air through the shell. Ends of the shell 38 are secured (e.g., welded) to the end caps 32 such that the entire assembly of parts is secured together as a unit. In certain embodiments, the top and bottom ends of the shell can include solid borders/bands to facilitate attaching the end caps thereto. In other embodiments, the end caps can be connected together by metal strips that extend along the exterior of the shell between the end caps such that the shell and filter media are captured between the end caps. It will be appreciated that various components of the air filter 28 are designed to withstand relatively high temperatures such as those generated by an exhaust stream. In certain embodiments, the shell 38 can be perforated metal or expanded metal. In other embodiments, the filter and shell can have other shapes such as a conical shape.

As depicted in FIG. 2, the air filter 28 has a hollow core 40. The end caps 32 define central openings 41 in axial alignment with the hollow core 40. In this embodiment, dirty air from an exhaust system is directed into the hollow core 40 through the central opening 41 of one of the end caps 32. From within the hollow core 40, the air is forced radially outwardly through the filter media 30 and the shell 38 to the atmosphere. This type of embodiment is a reverse-flow filter, since flow proceeds from inside the filter element radially outwardly through the filter element. In alternative embodiments, the filter unit can be provided with a reinforcing core (e.g., a perforated metal core or an expanded metal core) within the filter element, and flow can proceed from outside the filter element radially inwardly through the filter element into the interior of the core. Further, while the embodiment of FIG. 2 has two open-ended caps, in alternative embodiments at least one of the end caps may be closed.

In use, the filter 28 can be mounted to an exhaust pipe for conveying an exhaust stream away from an engine. For example, the filter 28 can be mounted within a filter housing secured (e.g., clamped) to the end of an exhaust pipe. When mounted within the housing, one of the gaskets forms a seal with the housing, while the other gasket forms a seal with a mounting plate that is clamped or otherwise fastened to the housing to firmly secure the filter 28 within the housing. For single gasket embodiments (e.g., embodiments with one of the end caps closed), other filter housing constructions will be used. It will be appreciated that a large number of techniques for mounting filters within air streams are known, and that all of the various techniques are within the scope of the present invention.

B. Example Filter Media

The filter media 30 preferably has a construction suitable for high temperature applications such as exhaust systems. In one embodiment, the filter media 30 is constructed to not generate harmful levels of off-gasses when exposed to continuous operating temperatures equal to or greater than 500° F. In another embodiment, the filter media 30 is constructed to not generate harmful levels of off-gasses when exposed to continuous operating temperatures that exceed 650° F. In certain other embodiments, the filter media is constructed of a material that does not generate harmful levels of off-gasses when exposed to temperatures excursions equal to or greater than 800° F., or equal to or greater than 900° F. As defined herein, harmful levels of off-gasses include levels of harmful off-gasses that that exceed permissible regulatory limits.

In one embodiment, the filter media 30 is folded into a pleated configuration, and rolled into a cylinder (see FIG. 3). As shown in FIG. 4, the filter media 30 has a laminated construction with a layer of filter material 50 secured between two layers of reinforcing material or scrim such as mesh screen 51 or expanded metal. In certain embodiments, the filter media includes a layer fibers (e.g., glass or ceramic fibers). The layer can include woven or non-woven (e.g., matted) fibers. An example material includes a fiberglass filter material is sold by Filtration Specialties Inc. under the name Dynaglas® 2201. Other materials capable of withstanding relatively high temperatures, whether fibrous or non-fibrous, can also be used. In other embodiments, the media can be supported by a single reinforcing layer rather than being sandwiched between two reinforcing layers.

In certain embodiments, the screen 51 can include a mesh coated with a protective layer. The mesh can be manufactured of a metal material such as metal wire. In one embodiment, the metal material can include steel with a residual outer layer of copper. The protective layer provides a number of functions. First, the layer is preferably capable of withstanding temperatures comparable to those specified with respect to the filter media. The protective layer resists corrosion of the screen 51. In embodiments where the material of the screen includes copper, the protective layer isolates the copper from the exhaust stream to prevent the copper from reacting with sulfur in the exhaust stream and generating copper sulfate. An example protective layer includes an aluminum paint material or an epoxy coating.

C. Example End Caps and Outer Shell

Components such as end caps, cores or shells used in filters in accordance with the present disclosure preferably have a construction adapted to resist degradation/deterioration when exposed to high temperatures such as those present in the exhaust stream of an engine. In certain embodiments, the components are constructed of a material that does not generate harmful levels of off-gasses when exposed to continuous operating temperatures equal to or greater than 500° F. In certain other embodiments, the components are constructed of a material that does not generate harmful levels of off-gasses when exposed to continuous operating temperatures equal to or greater than 650° F. In certain other embodiments, the components are constructed of a material that does not generate harmful levels of off-gasses when exposed to temperatures excursions equal to or greater than 800° F., or equal to or greater than 900° F. In a preferred embodiment some or all of the components have an aluminized steel construction.

D. Example Gasket

The gaskets 36 preferably have a construction suitable for high temperature applications such as exhaust systems. In certain embodiments, the gaskets are constructed of a material that does not generate harmful levels of off-gasses when exposed to continuous operating temperatures equal to or greater than 500° F. In certain other embodiments, the gaskets are constructed of a material that does not generate harmful levels of off-gasses when exposed to continuous operating temperatures equal to or greater than 650° F. In certain other embodiments, the gaskets are constructed of a material that does not generate harmful levels of off-gasses when exposed to temperature excursions equal to or greater than 800° F., or equal to or greater than 900° F.

In one embodiment, the gaskets 36 are formed by a generally flat sheet of fabric material provided in a ring shape that surrounds the central openings 41 of the end caps 32 (see FIG. 3). The fabric can have fibers arranged in a woven or non-woven (e.g., matted) construction. The gaskets can include a glass fiber construction, a ceramic fiber construction, a basalt fiber construction, or other fibrous constructions capable of withstanding the relatively high temperatures environments. In one particular embodiment, the gaskets can include a fiberglass mat laminated to fiberglass cloth. In certain embodiments, the gaskets 36 each have a generally rectangular cross-sectional profile (see FIG. 2). In one embodiment, the gaskets can include chopped "E"

glass fibers having a nominal fiber diameter of 0.00036 inches needled into the mat without a resin binder. Example thicknesses of the gaskets are in the range of 0.1-1.0 inches. While fibrous gaskets are preferred, non-fibrous gaskets capable of withstanding relatively high temperature environments could also be used.

In a preferred embodiment, the gaskets 36 are secured to the end caps 32 by a mechanical fastening technique. For example, the gaskets can be secured to the end caps 32 by structures such as pins, clips, screws, bolts, flanges, rivets, hooks, catches, barbs, clamps or other fastening techniques. As shown in FIGS. 2, 3 and 5, the gaskets 36 are secured to the end caps 32 by staples 60 that are uniformly spaced about the circumference of the gaskets 36. The staples 60 are shown driven through the gaskets 36 and end caps 32, and into the potting material. In one embodiment, the staples are galvanized coated.

E. Example Potting Material

Potting material used in filters in accordance with the present disclosure preferably has a construction adapted to resist degradation/deterioration when exposed to high temperatures such as those present in the exhaust stream of an engine. In certain embodiments, the potting material is constructed of a material that does not generate harmful levels of off-gasses when exposed to continuous operating temperatures equal to or greater than 500° F. In certain other embodiments, the potting material is constructed of a material that does not generate harmful levels of off-gasses when exposed to continuous operating temperatures equal to or greater than 650° F. In certain other embodiments, the potting material is constructed of a material that does not generate harmful levels of off-gasses when exposed to temperatures excursions equal to or greater than 800° F., or equal to or greater than 900° F. In one embodiment, the potting material includes a silicone material. In another embodiment, the potting material can be replaced with a fabric layer compressed between the end caps and the ends of the filter media. The fabric layer can have a construction like the fibrous materials identified with respect to the gaskets.

Figure 8:
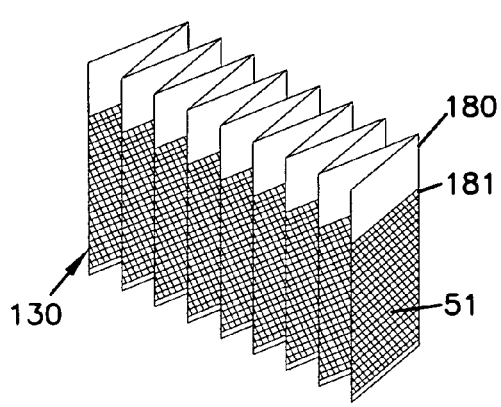
FIG. 8 illustrates a filter media of the embodiment of FIG. 6 prior to folding the axial extensions to form an end sealing structure.
Figure 9:
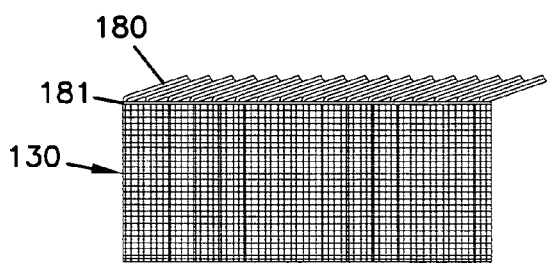
FIG. 9 illustrates the filter media of FIG. 8 after the axial extensions have been folded to form an end sealing structure.

FIG. 6 shows an alternative filter 128 having a filter media 130 mounted between end caps 132. Seals can be provided between the end caps 132 and the ends of the filter media 130 by folding axial extensions 180 of the filter media 130 over the axial ends of the pleated filter media 130 (as shown at FIG. 7), such that the folded extensions overlap to fully cover the ends of the filter media. The axial extensions 180 can be held in place at the ends of the filter media by fastening or otherwise securing the end caps 132 to a shell (e.g., a shell similar to shell 38 of FIG. 2) such that the extensions of the filter media are fixed in place via compression from the end caps 132. In embodiments where the filter medias includes a backing/reinforcing material such a screen 51, the screen 51 preferably extends only to the axial ends 181 of the pleated filter media 130 (as shown in FIG. 8) such that the screen 51 is not present in the folded axial extensions 180 of the filter media. To manufacture the filter 128, the media 130 is pleated as shown at FIG. 8. The extensions 180 are then folded over onto adjacent pleats in a fan-like manner to completely cover the ends of the filter media 130 as shown at FIG. 9. The end caps 132 are then mounted over the ends of the filter media 130 with the folded over extensions 180 lining the interior of the caps 132. A shell is then mounted about the exterior of the filter media 130 and end caps 132 are secured to the ends of the shell to hold the assembly together as one unit.

In alternative embodiments, other more rigid materials can be used as potting materials. For example, in one embodiment, a ceramic potting compound can be used. In use, the ceramic is applied to the interior of the end caps in a liquid or paste form. The ends of the filter media are then inserted into and embedded in the ceramic within the end caps. The ceramic is then allowed to cure and thus harden within the end caps. After hardening, the ceramic does not adhere well to the metal end caps any may have a tendency to fall out. Therefore, the end caps are preferably provided with structure for retaining the ceramic therein after hardening.

Figure 10:
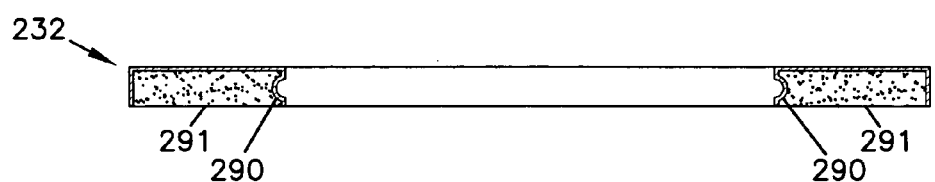
FIG. 10 shows an end cap having features that are examples of inventive aspects in accordance with the principles of the present disclosure.
Figure 11:
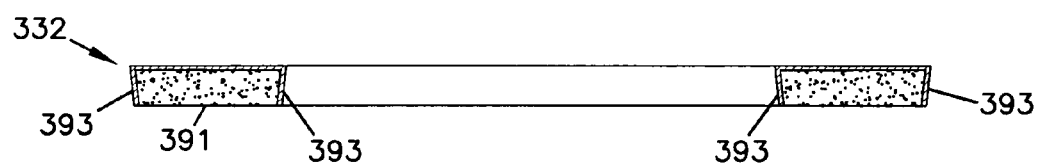
FIG. 11 shows another end cap having features that are examples of inventive aspects in accordance with the principles of the present disclosure.
Figure 12:
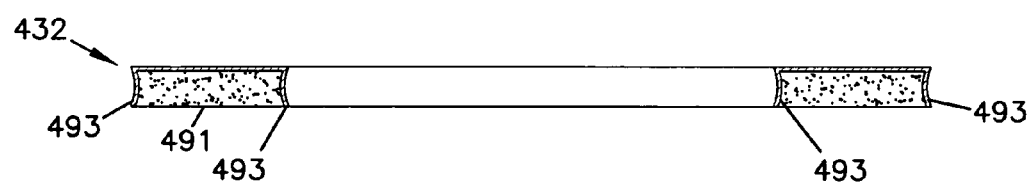
FIG. 12 shows a further end cap having features that are examples of inventive aspects in accordance with the principles of the present disclosure.

FIG. 10 shows an end cap 232 having dimples 290 that project into ceramic potting 291 within the end cap 232 to prevent the ceramic potting 291 from dislodging from the end cap 232. FIG. 11 shows an end cap 332 having tapered walls 393 for retaining ceramic potting 391 within the end cap 332. The walls 393 converge as the walls extend from a closed end to an open end of the end cap 332. FIG. 12 shows an end cap 432 having walls 493 for retaining ceramic potting 491 within the end cap 432.

Figure 13:
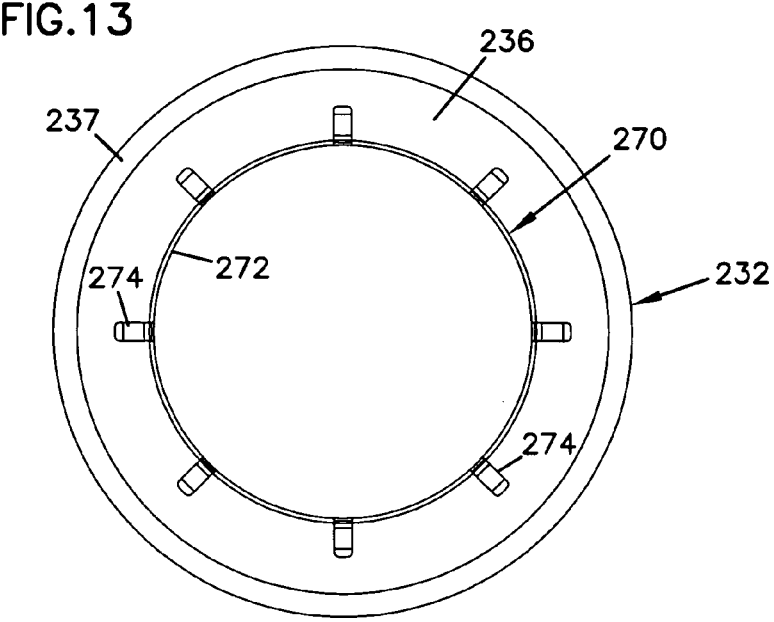
FIG. 13 is a plan view of the end cap of FIG. 10 with a clip being used to secure a gasket thereto.
Figure 14:
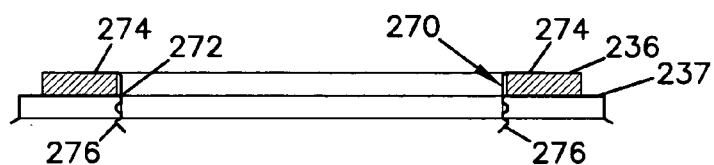
FIG. 14 is a cross-sectional view taken along section line 14-14.

Referring to FIGS. 13 and 14, the end cap 232 is shown with a clip 270 being used to retain a fibrous annular gasket 236 at the outer end surface 237 of the end cap 232. The clip 270 includes a ring portion 272 that forms a main body of the clip 270. The ring portion extends through the central holes of the end cap 232 and the gasket 236. The clip 270 also includes gasket retention fingers 274 that project radially outwardly from the upper edge of the ring portion 272. The fingers 274 overlap the gasket 236 and compress the gasket 236 against the outer end surface 237 of the end cap 232. Mechanical retention tabs 276 are provided at the lower edge of the ring portion 272. The tabs 276 provide a mechanical interlock (e.g., a snap-fit) with the interior of the end cap 232. In other embodiments, the clip 270 could be welded (e.g., spot welded) to the end cap 232.

Figure 15:
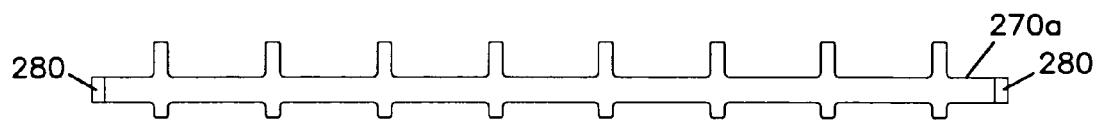
FIG. 15 is a plan view of the clip of FIGS. 13 and 14 in a precursor state.
Figure 17:
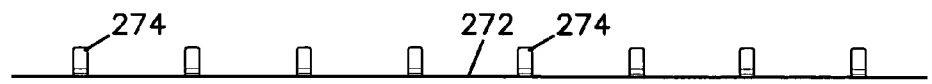
FIG. 17 is a top view of FIG. 16.
Figure 16:
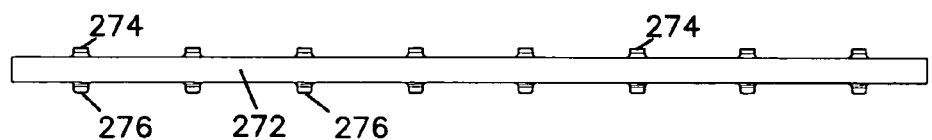
FIG. 16 is a side view of the clip of FIGS. 13 and 14 prior to being roller into a ring shape.
Figure 18:
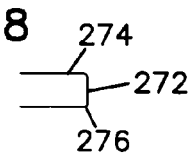
FIG. 18 is an end view of FIG. 16.

In one embodiment, the clip 270 can be made by stamping the clip from a sheet of metal. A flat, precursor clip 270a stamped from a sheet of metal is shown at FIG. 15. After stamping the precursor clip 270a, the fingers 274 and the tabs 276 are bent as shown at FIGS. 16-18. The main body is then curled in a circle, and ends 280 of the main body are attached together (e.g., by fasteners, welding a mechanical interlock, etc.) to complete the manufacturing process.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An exhaust filter comprising:
   a pleated filter element having first and second ends;
   a first end cap mounted at the first end of the filter element and a second end cap mounted at the second end of the filter element;
   a sealing gasket provided at the first end cap; and
   the filter element, the first and second end caps and the sealing gasket each being constructed of a material that does not generate harmful levels of off-gasses when exposed to continuous operating temperatures that exceed 500° F.;
   wherein the filter element includes a filter material laminated to a mesh, and wherein the mesh is coated with a protective layer for withstanding continuous operating temperatures that exceed 500° F.

2. The filter of claim 1, wherein the end caps include aluminized steel.

3. The filter of claim 1, wherein the filter element includes a fibrous construction.

4. The filter of claim 3, wherein the filter element includes glass fibers.

5. The filter element of claim 3, wherein the filter element includes ceramic fibers.

6. The filter of claim 1, wherein the filter material is laminated between two meshes.

7. The filter of claim 1, wherein the protective layer includes an aluminum paste.

8. The filter of claim 1, wherein the mesh includes steel and copper, and wherein the protective layer is adapted to isolate the copper from an exhaust stream.

9. The filter of claim 1, wherein the gasket is mechanically secured to the first end cap.

10. The filter of claim 9, wherein the gasket is stapled to the first end cap.

11. The filter of claim 9, wherein the gasket includes a fibrous construction.

12. An exhaust filter comprising:
a pleated filter element having first and second ends;
a first metal end cap mounted at the first end of the filter element and a second metal end cap mounted at the second end of the filter element, the first end cap including an axial wall defining an outer axial end surface; and
a first sealing gasket mechanically secured at the outer axial end surface of the first end cap by at least a first fastening member that punctures through the axial wall of the first end cap.

13. The filter of claim 12, wherein the first fastening member includes a staple.

14. The filter of claim 12, wherein the gasket includes a fibrous construction.

15. The filter of claim 12, wherein the sealing gasket includes glass fibers.

16. The filter of claim 12, wherein the sealing gasket includes ceramic fibers.

17. The filter of claim 12, wherein the sealing gasket includes basalt fibers.

18. An exhaust filter comprising:
a pleated filter element having first and second ends;
a first metal end cap mounted at the first end of the filter element and a second metal end cap mounted at the second end of the filter element, the first and second end caps each including an axial end wall defining an outer axial end surface that faces away from the pleated filter element and an inner axial end surface that faces toward the pleated filter element;
potting material positioned at the inner axial end surfaces of the first and second end caps; and
sealing gaskets secured at the outer axial end surfaces of the first and second end caps by fastening members that penetrate the axial end walls of the first and second end caps and extend into the potting material positioned at the inner axial end surface of the first and second end caps, the sealing gaskets having a fibrous construction.

19. The filter of claim 18, wherein the fibrous construction includes glass fibers.

20. The filter of claim 12, wherein the first fastening member includes a plurality of first fastening members that puncture through the outer axial end surface of the first end cap.

21. The filter of claim 12, wherein the second end cap includes an axial wall defining an outer axial end surface, and wherein a second sealing gasket mechanically secured at the outer axial end surface of the second end cap by at least a second fastening member that punctures through the axial wall of the second end cap.

22. The filter of claim 20, wherein the second end cap includes an outer axial end surface, and wherein a second sealing gasket mechanically secured at the outer axial end surface of the second end cap by a plurality of second fastening members that puncture through the outer axial end surface of the second end cap.

* * * * *